(12) United States Patent
Toko

(10) Patent No.: US 8,702,258 B2
(45) Date of Patent: Apr. 22, 2014

(54) ILLUMINATION OPTICAL SYSTEM AND METHOD OF MANUFACTURING ILLUMINATION OPTICAL SYSTEM

(75) Inventor: Yasuo Toko, Tokyo (JP)

(73) Assignee: Stanley Electric Co., Ltd., Tokyo (JP)

(*) Notice: Subject to any disclaimer, the term of this patent is extended or adjusted under 35 U.S.C. 154(b) by 239 days.

(21) Appl. No.: 13/400,914

(22) Filed: Feb. 21, 2012

(65) Prior Publication Data
US 2012/0212933 A1     Aug. 23, 2012

(30) Foreign Application Priority Data
Feb. 22, 2011     (JP) .................................. 2011-035927

(51) Int. Cl.
*F21V 9/16*     (2006.01)
*F21S 8/10*     (2006.01)
*F21Y 101/02*   (2006.01)

(52) U.S. Cl.
CPC ............... *F21V 9/16* (2013.01); *F21S 48/1136* (2013.01); *F21Y 2101/025* (2013.01)
USPC ........................................................ 362/84

(58) Field of Classification Search
CPC ........................................................ F21V 9/16
USPC ............................................. 362/84, 538, 259
See application file for complete search history.

(56) References Cited

U.S. PATENT DOCUMENTS 7,150,552 B2 * 12/2006 Weidel .......................... 362/545
8,569,942 B2 * 10/2013 Kishimoto et al. ........... 362/538

FOREIGN PATENT DOCUMENTS

JP     5-139203 A     6/1993
JP     2008-152980 A  7/2008

* cited by examiner

*Primary Examiner* — Bao Q Truong
(74) *Attorney, Agent, or Firm* — Kenealy Vaidya LLP

(57) ABSTRACT

A compact illumination optical system manufactured at reasonable cost can be provided. The illumination optical system can include: a light source for emitting a light beam; a hologram element for converting the light beam emitted from the light source to reproduced light having a predetermined shape of light distribution and a predetermined luminance distribution; a fluorescent plate containing a fluorescent material for emitting visible light by absorbing the reproduced light emitted from the hologram element and entering the fluorescent material; and a lens for projecting forward the visible light emitted from the fluorescent plate.

16 Claims, 3 Drawing Sheets

ILLUMINATION OPTICAL SYSTEM AND METHOD OF MANUFACTURING ILLUMINATION OPTICAL SYSTEM

This application claims the priority benefit under 35 U.S.C. §119 of Japanese Patent Application No. 2011-035927 filed on Feb. 22, 2011, which is hereby incorporated in its entirety by reference.

TECHNICAL FIELD

The presently disclosed subject matter relates to an illumination optical system, and more specifically, to an optical system for a vehicle headlight.

BACKGROUND ART

Conventionally known optical systems for vehicle headlights include an optical system using an incoherent light source such as a halogen light source, an HID light source, and an LED light source. An optical system used as a vehicle headlight is required to form a high beam light distribution pattern and a low beam light distribution pattern. The conventional optical system for a vehicle headlight forms a light distribution pattern, for example, with a reflection surface of a reflector disposed around a light source, causes light from the light source to be reflected by the reflection surface, inverts and projects the light forward through the projection lens (see Japanese Patent Application Laid-Open No. 2008-152980, for example).

Formation of a desired light distribution pattern with a hologram optical element is also known. To be specific, the hologram optical element can be disposed in front of a projection lens, and a region irradiated with a headlight is magnified by making refraction, thereby forming the desired light distribution pattern (see Japanese Patent Application Laid-Open No. Hei. 5-139203 (1993), for example).

SUMMARY

The presently disclosed subject matter was devised in view of these and other problems and features and in association with the conventional art. According to an aspect of the presently disclosed subject matter, a compact illumination optical system manufactured at reasonable costs can be provided.

According to another aspect of the presently disclosed subject matter, an illumination optical system can include: a light source for emitting a light beam; a hologram element configured to convert the light beam emitted from the light source to reproduced light having a predetermined shape of light distribution and a predetermined luminance distribution; a fluorescent plate containing a fluorescent material for emitting visible light by absorbing the reproduced light emitted from the hologram element and entering the fluorescent material; and a lens for projecting forward the visible light emitted from the fluorescent plate.

The presently disclosed subject matter can provide a compact illumination optical system manufactured at reasonable costs.

According to still another aspect of the presently disclosed subject matter, a method for manufacturing an illumination optical system can be provided. Herein, the illumination optical system can include: a light source for emitting a light beam; a hologram element configured to convert the light beam emitted from the light source to reproduced light having a predetermined shape of light distribution and a predetermined luminance distribution; a fluorescent plate containing a fluorescent material for emitting visible light by absorbing the reproduced light emitted from the hologram element and entering the fluorescent material; and a lens for projecting forward the visible light emitted from the fluorescent plate. The method can include photographing an interference, or calculating a design for the hologram element and processing a material for the hologram element to produce the hologram element.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to illumination optical systems of the presently disclosed subject matter with reference to the accompanying drawings in accordance with exemplary embodiments.

Figure 1:
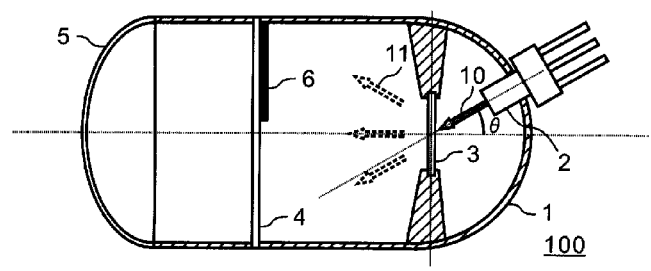
FIG. 1 is a schematic view showing an example of an illumination optical system according to a first exemplary embodiment made in accordance with principles of the presently disclosed subject matter.
Figure 2:
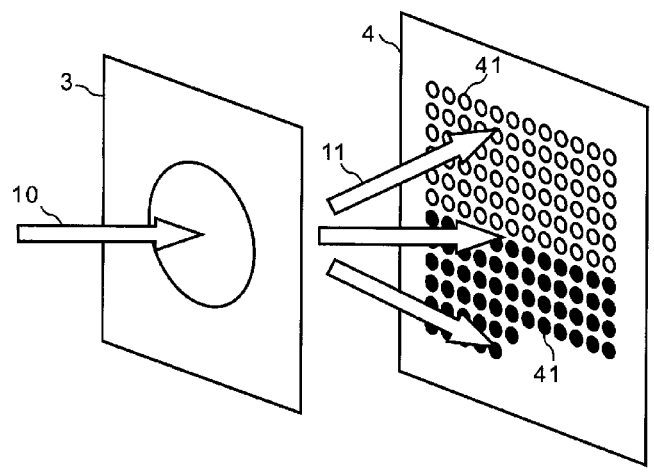
FIG. 2 is a perspective view schematically showing a hologram optical element and a fluorescent plate of the illumination optical system shown in FIG. 1.

FIG. 1 is a schematic view showing an example of an illumination optical system 100 of a first exemplary embodiment made in accordance with principles of the presently disclosed subject matter. FIG. 2 is a perspective view schematically showing a hologram optical element 3 and a fluorescent plate 4 of the illumination optical system 100 shown in FIG. 1.

As an example, the illumination optical system 100 can be an illumination unit such as a projection type vehicle headlight. The illumination optical system 100 can include at least a cover 1, a light source 2, a hologram optical element (diffraction optical element) 3, a fluorescent plate 4, a projector lens (projection lens) 5, and a light-shielding film (cut-off pattern) 6. The light source 2, the hologram optical element 3, the fluorescent plate 4, and the projector lens (projection lens) 5 can be held by the cover 1.

The light source 2 can be a high-output laser such as a semiconductor laser diode (LD). As an example, the light source 2 can project a blue laser (illuminating light) 10 having a center wavelength of 405 nm onto a surface of the hologram optical element 3 from a direction that makes the blue laser 10 enter the surface of the hologram optical element 3 at a predetermined angle θ. In another exemplary embodiment, the light source 2 may be a high-output LED.

The center wavelength is not limited to 405 nm, but the blue laser 10 may be a blue laser having a different center wavelength or an ultraviolet ray (having a center wavelength of 375 nm, for example). In an exemplary embodiment, the center wavelength of the blue laser 10 can be 450 nm or shorter.

The hologram optical element 3 can be disposed on the optical axis of the light source 2, and can have a wavefront conversion function. The wavefront conversion function is a function of converting the short-wavelength laser (illuminating light) 10 emitted from the light source 2 to reproduced light 11 having a desired light distribution pattern (condition of light distribution used for, for example, a headlight). In the first exemplary embodiment, the hologram optical element 3 can form not only the shape of light distribution of the reproduced light 11 but also the luminance distribution thereof. The hologram optical element 3 can have nano-level finishing. Accordingly, the hologram optical element 3 can form the distribution of intensity of blue laser light with a predetermined cut-off shape. The hologram optical element 3 can be formed by photographing by an optical splitting interference exposure device 300 shown in FIG. 3. Formation of the hologram optical element 3 will be described later in detail with reference to FIG. 3.

The fluorescent plate 4 can be disposed in a stage subsequent to the hologram optical element 3, and at a position near the focal position of the projector lens 5. The fluorescent plate 4 can be formed by applying a fluorescent material 41 onto a transparent substrate made of a resin or glass, or by mixing the fluorescent material 41 into a transparent substrate made of a resin or glass. The fluorescent plate 4 used in the first exemplary embodiment is formed by mixing the fluorescent material 41 into a glass substrate.

The transparent substrate for the fluorescent plate 4 is made of glass, or a resin having the highest possible resistance to heat and resistance to light. Such a resin may be plastic, and examples thereof may include ABS (acrylonitrile butadiene styrene) resins, silicone resins, polycarbonate resins, polystyrene resins, acrylic resins, and epoxy resins.

The fluorescent material 41 can be a material which absorbs light in a wavelength region ranging from the wavelength of ultraviolet light to that of blue light, and emits visible light. In an exemplary embodiment, the fluorescent material 41 can be a material that generates yellow light, or green light and red light in response to the wavelength of blue or ultraviolet light. Examples of a material for generating yellow light may include YAG fluorescent materials. Examples of other applicable fluorescent materials may include silicate-based fluorescent materials, aluminate-based fluorescent materials, nitride-based fluorescent materials, sulfide-based fluorescent materials, oxysulfide-based fluorescent materials, borate-based fluorescent materials, phosphate-borate-based fluorescent materials, phosphate-based fluorescent materials, and halophosphate-based fluorescent materials.

In an exemplary embodiment, the thickness of the fluorescent plate 4 (thickness of the applied fluorescent material 41 if the fluorescent plate 4 is formed by applying the fluorescent material 41), and the density of the fluorescent material 41 can be determined optimally according to the amount of light emitted from the light source 2. In this first exemplary embodiment, light emitted from the fluorescent plate 4 can be white light. Accordingly, an exemplary embodiment of the fluorescent plate 4 can have a thickness and a density that leave blue color of the light source 2 unremoved. Further, a central portion of the fluorescent plate 4 can be bright while light distribution of a passing beam (low beam) is formed, for example. Accordingly, in this exemplary embodiment, the density of the fluorescent material 41 can be increased at the central portion, or the thickness of the fluorescent plate 4 can be increased at the central portion. Accordingly, the thickness of the fluorescent plate 4 (thickness of the applied fluorescent material 41 if the fluorescent plate 4 is formed by applying the fluorescent material 41), and the density of the fluorescent material 41 can be changed in response to the luminance distribution of the reproduced light 11, making it possible to obtain white light in every direction. Namely, the fluorescent material can be provided in accordance with a density distribution or a thickness distribution corresponding to the luminance distribution.

In FIG. 2, in order to show the high density of the fluorescent material 41 covering substantially the lower part of the fluorescent plate 4 corresponding to the central portion that is made bright while light distribution of a passing beam (low beam) is formed, the fluorescent material 41 in the lower part is indicated by black circles. Further, the fluorescent material 41 covering substantially the relatively dark upper part of the fluorescent plate 4 is indicated by white circles. The fluorescent material 41 is not provided in a region below a cut-off line at the lower right of the fluorescent plate 4.

The projector lens (projection lens) 5 can be a convex lens that can collect the reproduced light 11 emitted from the fluorescent plate 4, and projects the collected reproduced light 11 forward.

The light-shielding film (cut-off pattern) 6 can shield part of the reproduced light 11 to cut off unnecessary light while light distribution of a passing beam (low beam) is formed, for example, thereby forming the cut-off line. The light-shielding film 6 is not an absolutely necessary structure, but it can be omitted if the reproduced light 11 can be distributed in a desired cut-off shape only with the hologram optical element 3.

In the aforementioned structure, in response to turn-on of the light source 2, the laser light (illuminating light) 10 can enter the hologram optical element 3 at the predetermined angle θ. Then, the light (reproduced light) 11 formed by causing the laser light 10 to pass through the hologram optical element 3 can form a predetermined optical image. The optical image having an optical distribution can be projected on the fluorescent plate 4. The reproduced light 11, which is blue light projected on the fluorescent plate 4, can be applied to the fluorescent material 41. In response, part of the fluorescent material 41 can generate yellow light, or green light and red light. Consequently, since blue color of the light source 2 is left unremoved, the emitted light as a whole can be white light as a result of color addition of light. The fluorescent plate 4 can be disposed at or near the focal point of the projector lens 5. Accordingly, an image formed from the white light generated from the fluorescent plate 4 can pass through the projector lens 5 to be inverted, and is then projected forward.

Figure 3:
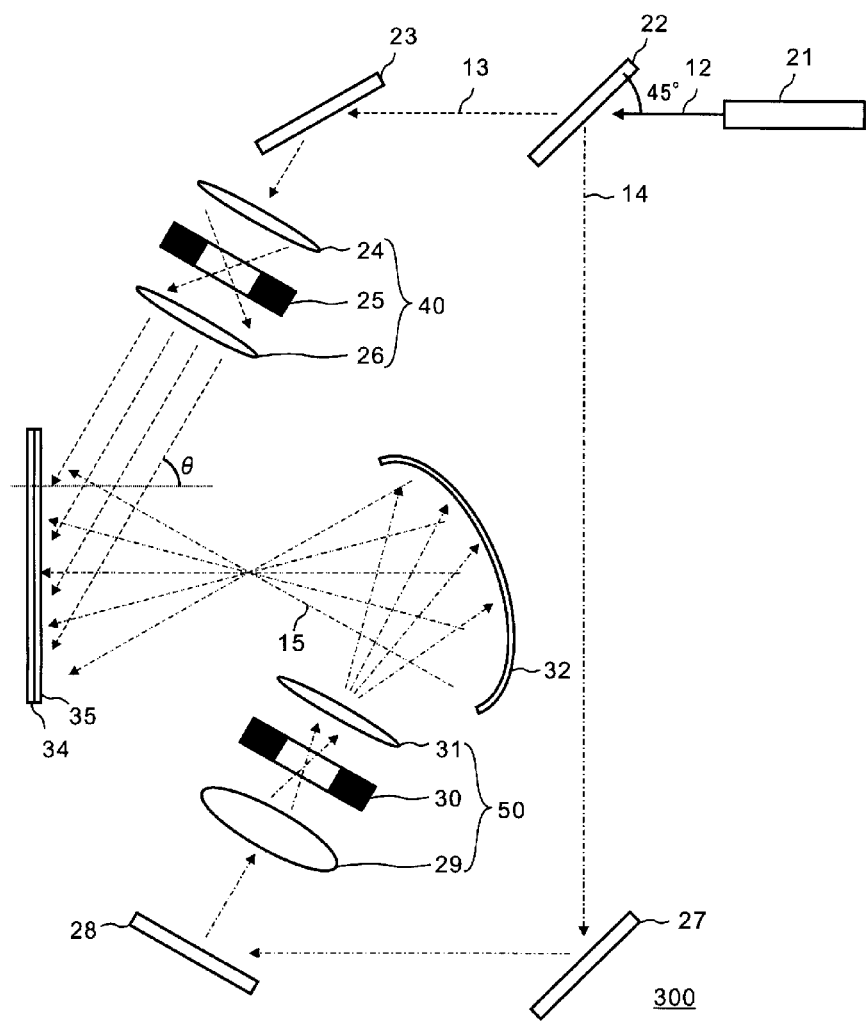
FIG. 3 is a schematic view showing an example of an optical splitting interference exposure device used to form the hologram optical element according to the first exemplary embodiment.

FIG. 3 schematically shows an example of the optical splitting interference exposure device 300 used to form the hologram optical element 3 of the first exemplary embodiment of the presently disclosed subject matter. Arrows shown in FIG. 3 indicate directions in which corresponding light beams travel. A method of forming the hologram optical element 3 by using the optical splitting interference exposure device 300 will be described below.

First, a photosensitive monomer (to become a polymer after being exposed to light) 35 is bonded to a transparent substrate 34 such as a glass substrate. Examples of the photosensitive monomer 35 may include the Dupon's photopolymer Omnidex and other photopolymers (such as silver halide emulsions). The photosensitive monomer 35 used in the present exemplary embodiment can be a photopolymer having sensitivity to the wavelength of blue color.

A laser light source 21 can be a laser oscillator having the same emission wavelength (405 nm, for example) as that of the light source 2 shown in FIG. 1. In an exemplary embodiment, the emission wavelength of the laser light source 21 can be within a range of ±10 nm with respect to the emission wavelength of the light source 2 shown in FIG. 1. A laser light beam 12 emitted from the laser light source 21 can enter a half mirror 22 at an angle of 45 degrees to be divided into two light beams 13 and 14.

The light beam 13 can enter a collimator (beam expander) 40 after reflected by a reflector mirror 23, if desired. The collimator 40 can be composed of a convergence lens 24, a pinhole 25, and a collimator lens 26.

The light beam 13 having entered the collimator 40 can be first caused to converge to a focal point inside the pinhole 25 by the convergence lens 24. The light beam 13 having passed through the focal point can spread out, and then can enter the collimator lens 26. The light beam 13 having entered the collimator lens 26 can be converted to parallel light beams to become reference light 13 to be used for forming a hologram.

The reference light 13 can enter a surface of the photosensitive monomer 35 at an angle θ in FIG. 3. In an exemplary embodiment, the incident angle θ in FIG. 3 can be the same as the incident angle of light from the light source 2 of the illumination optical system 100 shown in FIG. 1.

The optical beam 14 obtained as a result of splitting at the half minor 22 can be reflected by reflecting minors 27 and 28, and then can enter an object light optical system 50. The object light optical system 50 can be composed of a convergence lens 29, a pinhole 30, and a convex lens 31.

The light beam 14 having entered the object light optical system 50 can be first caused to converge to a focal point inside the pinhole 30 by the convergence lens 29. The light beam 14 having passed through the focal point can spread out, and then can enter the convex lens 31. The light beam 14 having entered the convex lens 31 can spread out further, and then can be incident on a reflector mirror 32.

Light reflected by the reflector minor (reflector minor for forming low beam light distribution) 32 becomes object light 15 to be used for forming a hologram, and then can enter the surface of the photosensitive monomer 35 from a generally normal direction. The reflector minor (reflector mirror for forming low beam light distribution) 32 can be used to obtain reflected light in a condition of desired light distribution. In the present exemplary embodiment, the reflector mirror 32 can be used to obtain a condition of light distribution desired for a passing beam (low beam).

The reference light 13 and the object light 15 having entered the photosensitive monomer 35 can interfere with each other. Respective phase information and respective amplitude information about the reference light 13 and the object light 15 can be recorded in the form of interference fringes in the photosensitive monomer 35. In an exemplary embodiment, a ratio of light intensity between the reference light 13 and the object light 15 to enter the photosensitive monomer 35 can be from about 2:1 to about 10:1. Further, the recording can be performed with the total sum of the light intensities of the reference light 13 and the object light 15 of 1 mJ/cm$^2$ for an irradiation period of 30 seconds.

The Dupon's photopolymer Omnidex used in the present exemplary embodiment can enhance a diffraction efficiency if it is subjected to heat treatment for two hours at a temperature of 120° C.

The formation of the hologram optical element 3 can be completed by following the aforementioned process. If laser light (or light from an LED) is applied to the hologram optical element 3 thereby formed at the angle θ, reproduced light resulting from the applied laser light can form an optical image (condition of low beam light distribution, for example) with the reflector mirror 32 in a normal direction opposite a light source.

As described above, in the first exemplary embodiment of the presently disclosed subject matter, the hologram optical element 3 using a volume hologram can convert the laser light 10 from the light source 2 efficiently to a desired light distribution pattern (such as a low beam light distribution pattern).

Also, in the first exemplary embodiment of the presently disclosed subject matter, the thickness of the fluorescent plate 4 (thickness of the applied fluorescent material 41 if the fluorescent plate 4 is formed by applying the fluorescent material 41) and the density of the fluorescent material 41 can be changed according to the amount of light emitted from the light source 2. This makes it possible to obtain white light in every direction.

Further, in the first exemplary embodiment of the presently disclosed subject matter, a light distribution pattern can be formed by using the hologram optical element 3, allowing size reduction of the illumination optical system (headlight) 100.

Still further, in the first exemplary embodiment of the presently disclosed subject matter, a single-color laser is applicable as the light source 2, making it possible to manufacture the illumination optical system (headlight) 100 at reasonable costs.

Figure 4:
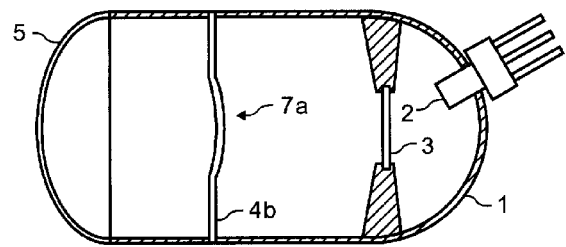
FIG. 4 is a schematic view showing an example of an illumination optical system of a modification of the first exemplary embodiment.
Figure 5:
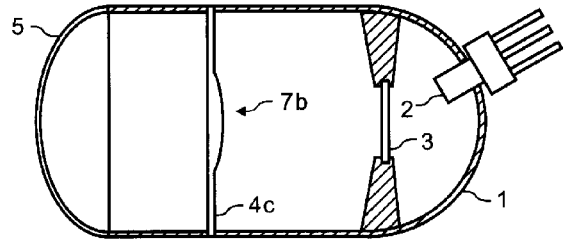
FIG. 5 is a schematic view showing another example of an illumination optical system of a modification of the first exemplary embodiment.

The fluorescent plate 4 shown in FIG. 1 may be a fluorescent plate 4b, as shown in FIG. 4, having a central portion 7a that is curved according to the focal distance of the projector lens (projection lens) 5. The fluorescent plate 4 shown in FIG. 1 may also be a fluorescent plate 4c, as shown in FIG. 5, having a central portion 7b the thickness of which is increased according to the luminance distribution of the reproduced light 11 emitted from the hologram optical element 3. Further, the central portion of the fluorescent plate 4 may be bulged into a hemisphere according to the focal distance of the projector lens (projection lens) 5. In order to use the fluorescent plate 4b or 4c shown in FIG. 4 or 5, the fluorescent plate 4b or 4c may be formed as follows. A glass or resin material is heated to be converted to a liquid form. Then, a fluorescent material is mixed into the material and stirred, and the mixture is poured into a mold having a desired shape for the fluorescent plate 4b or 4c.

Figure 6:
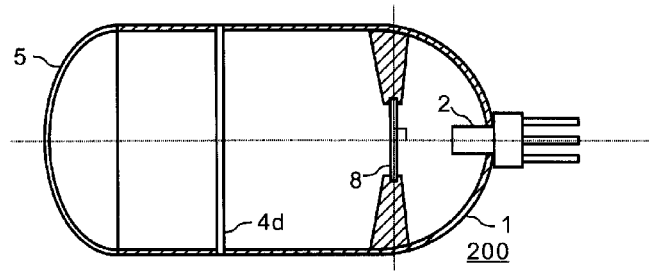
FIG. 6 is a schematic view showing an example of an illumination optical system according to a second exemplary embodiment made in accordance with principles of the presently disclosed subject matter.

FIG. 6 is a schematic view showing an example of an illumination optical system 200 of a second exemplary embodiment of the presently disclosed subject matter.

In the second exemplary embodiment, a hologram optical element 8 can be formed by a method different from the method of forming the hologram optical element 3 of the first exemplary embodiment. Accordingly, laser light from the light source 2 can enter the hologram optical element 8 at a different angle. The second exemplary embodiment can be the same as the first exemplary embodiment in other respects. Only differences from the first exemplary embodiment will be described below.

In the second exemplary embodiment, the hologram optical element 8 can be formed not by photographing by an optical splitting interference exposure device such as that used in the first exemplary embodiment, but by using a computer-generated hologram (CGH).

A hologram, which can store three-dimensional information, can be formed by a computer by simulating interference of light. In the second exemplary embodiment, optical design can be realized through calculation with a commercially available tool (software) for diffraction optical design. For the calculation for the optical design, information about a light source (a near field and a far field) and information about a resultant desirable optical image (shape distribution of an output and luminance distribution) can be entered into the tool and a simulation can be conducted. As a result, an optimum phase distribution can be obtained.

A phase distribution can be a distribution of micron-order or submicron-order irregularities. The phase distribution can be formed by laser lithography or electron beam lithography, for example. The phase distribution can also be formed by mechanical cutting, by an interference exposure device, and others.

Once an original phase distribution is formed, the shape thereof can be produced by reverse transfer with a mold, allowing formation of the hologram optical element 8 in large quantities at low costs. The sectional shapes of the irregularities representing the phase distribution can be required to have at least a two-level thickness distribution. In an exemplary embodiment, the phase distribution can have a stepwise shape with about eight levels. Ideally, a laser lithography machine and the like can be used as such a machine and can form a sectional shape having a continuously changing thickness.

A light-curable resin (such as an acrylic resin and an epoxy resin) can be used as a material to form irregularities representing a phase distribution by reverse transfer with a mold and the like. In actual experiments, the resin material used in the present exemplary embodiment had high resistance to heat, and provided a high transmittance of 90% or higher while showing substantially no change in transmittance (without being yellowed) even after being subjected to heat treatment at a temperature of 200° C. or higher. The resin material used in the present exemplary embodiment also has excellent adhesion to glass. Accordingly, a glass substrate was used as a substrate to be bonded to the light-curable resin.

Like the hologram optical element 3 of the first exemplary embodiment, the hologram optical element 8 of the second exemplary embodiment formed in the aforementioned manner can convert a laser light beam emitted from a light source 2 to reproduced light having a predetermined luminance distribution (such as that applied suitably for condition of low beam light distribution) and a predetermined shape of light distribution (such as that applied suitably for condition of low beam light distribution). Like in the first exemplary embodiment, the reproduced light emitted from the hologram optical element 8 can be inverted and projected forward through a projector lens 5 via a fluorescent plate 4d.

The hologram optical element 8 of the second exemplary embodiment formed by using a CGH can remove substantially the entire zero-order light (light to pass through the hologram optical element 8 without being diffracted). This allows the light source 2 to be disposed such that reproduced light exits the hologram optical element 8 in a direction normal to the hologram optical element 8 as shown in FIG. 6. If the zero-order light is left unremoved, the zero-order light can be utilized by making a direction in which the zero-order light travels agree with a direction of the highest brightness in a light distribution pattern.

The hologram optical element 8 formed by using a CGH can reproduce an optical image including a cut-off pattern, making the light-shielding film 6 of FIG. 1 be not an absolute necessity. This enhances efficiency of use of light, compared to that obtained by using the light-shielding film 6.

As described above, in the second exemplary embodiment of the presently disclosed subject matter, the hologram optical element 8 formed by using a computer-generated hologram (CGH) can convert laser light 10 from the light source 2 efficiently to a desired light distribution pattern (such as a low beam light distribution pattern).

Also, like in the first exemplary embodiment, the thickness of a fluorescent plate 4d (thickness of an applied fluorescent material 41 if the fluorescent plate 4b is formed by applying the fluorescent material 41) and the density of the fluorescent material 41 can be changed according to the amount of light emitted from the light source 2 in the second exemplary embodiment of the presently disclosed subject matter. This makes it possible to obtain white light in every direction.

Further, in the second exemplary embodiment of the presently disclosed subject matter, a light distribution pattern can be formed by using the hologram optical element 8, allowing size reduction of the illumination optical system (headlight) 200.

Still further, in the second exemplary embodiment of the presently disclosed subject matter, a single-color laser is applicable as the light source 2, making it possible to manufacture the illumination optical system (headlight) 200 at reasonable cost. Additionally, the hologram optical element 8 can be formed by reverse transfer, making it possible to manufacture the illumination optical system (headlight) 200 at more reasonable cost.

The presently disclosed subject matter is not intended to be limited to the embodiments described above. It is contemplated that various changes, modifications, combinations and others of the presently disclosed subject matter can be devised and fall within the scope of the disclosed subject matter.

The illumination optical system of each of the exemplary embodiments of the presently disclosed subject matter is applicable to various illumination units such as a headlight, a tail light and a fog lamp of a vehicle, a flashlight, general illumination, a spotlight, stage illumination, special illumination, and the interior illumination and the exterior illumination of a vehicle.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. An illumination optical system, comprising:
   a light source configured to emit a light beam;
   a hologram element configured to convert the light beam emitted from the light source to reproduced light having a predetermined shape of light distribution and a predetermined luminance distribution;
   a fluorescent plate including a fluorescent material configured to emit visible light by absorbing the reproduced light emitted from the hologram element and entering the fluorescent material; and
   a lens configured to project the visible light emitted from the fluorescent plate forward.

2. The illumination optical system according to claim 1, wherein the light beam emitted from the light source has a center wavelength of 450 nm or shorter, and the fluorescent material is configured to absorb light in a wavelength region ranging from ultraviolet light wavelength to blue light wavelength, and is configured to emit visible light.

3. The illumination optical system according to claim 1, wherein the fluorescent material is provided in accordance with a density distribution or a thickness distribution corresponding to the luminance distribution.

4. The illumination optical system according to claim 2, wherein the fluorescent material is provided in accordance with a density distribution or a thickness distribution corresponding to the luminance distribution.

5. The illumination optical system according to claim 1, wherein the hologram element is configured to form a shape of light distribution of the reproduced light and a luminance distribution of the reproduced light.

6. The illumination optical system according to claim 2, wherein the hologram element is configured to form a shape of light distribution of the reproduced light and a luminance distribution of the reproduced light.

7. The illumination optical system according to claim 3, wherein the hologram element is configured to form a shape of light distribution of the reproduced light and a luminance distribution of the reproduced light.

8. The illumination optical system according to claim 4, wherein the hologram element is configured to form a shape of light distribution of the reproduced light and a luminance distribution of the reproduced light.

9. A method for manufacturing an illumination optical system, the illumination optical system including: a light source configured to emit a light beam; a hologram element configured to convert the light beam emitted from the light source to reproduced light having a predetermined shape of light distribution and a predetermined luminance distribution; a fluorescent plate including a fluorescent material for emitting visible light by absorbing the reproduced light emitted from the hologram element and entering the fluorescent material; and a lens configured to project the visible light emitted from the fluorescent plate forward, the method comprising:

photographing an interference to produce the hologram element.

10. A method for manufacturing an illumination optical system, the illumination optical system including: a light source configured to emit a light beam; a hologram element configured to convert the light beam emitted from the light source to reproduced light having a predetermined shape of light distribution and a predetermined luminance distribution; a fluorescent plate including a fluorescent material for emitting visible light by absorbing the reproduced light emitted from the hologram element and entering the fluorescent material; and a lens configured to project the visible light emitted from the fluorescent plate forward, the method comprising:

calculating a design for the hologram element and processing a material for the hologram element to produce the hologram element.

11. The illumination optical system according to claim 1, wherein the fluorescent plate contains a fluorescent material configured to emit visible light by absorbing the reproduced light emitted from the hologram element.

12. The illumination optical system according to claim 1, wherein the halogen element has nano-level finishing.

13. The illumination optical system according to claim 1, wherein the light source is a laser diode.

14. The illumination optical system according to claim 1, wherein the light source is a light emitting diode.

15. The illumination optical system according to claim 1, wherein the light source is configured to project light evenly about and along a light emitting axis, and the light emitting axis intersects the hologram element at a predetermined angle θ greater than zero and less than ninety degrees.

16. The illumination optical system according to claim 1, wherein the light source is configured to project light evenly about and along a light emitting axis, and the light emitting axis intersects the hologram element at a substantially ninety degree angle.

* * * * *